(12) United States Patent
Anderson

(10) Patent No.: US 7,792,824 B2
(45) Date of Patent: Sep. 7, 2010

(54) APPARATUS AND METHOD FOR ENABLING PARALLEL PROCESSING OF A COMPUTER PROGRAM USING EXISTING DATABASE PARALLELISM

(75) Inventor: Mark John Anderson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1613 days.

(21) Appl. No.: 10/753,517

(22) Filed: Jan. 8, 2004

(65) Prior Publication Data

US 2005/0182782 A1    Aug. 18, 2005

(51) Int. Cl.
*G06F 17/30* (2006.01)
(52) U.S. Cl. .................................. 707/719; 707/764
(58) Field of Classification Search ................. 707/2, 707/4, 102, 719, 764; 718/103
See application file for complete search history.

(56) References Cited

U.S. PATENT DOCUMENTS

| | | | | |
|---|---|---|---|---|
| 5,530,883 A | * | 6/1996 | Baum et al. | 712/18 |
| 5,542,088 A | * | 7/1996 | Jennings et al. | 718/103 |
| 5,802,512 A | * | 9/1998 | Wallack | 707/2 |
| 6,285,996 B1 | * | 9/2001 | Jou et al. | 707/4 |
| 2002/0099716 A1 | * | 7/2002 | Thompson | 707/102 |

\* cited by examiner

*Primary Examiner*—Tony Mahmoudi
*Assistant Examiner*—Paul Kim
(74) *Attorney, Agent, or Firm*—Martin & Associates, LLC; Derek P. Martin

(57) ABSTRACT

An apparatus and method enable parallelism in a computer program using parallelism that is built-in to many modem database managers. The parallelism provided by a database manager in executing user-defined functions provides an easy way to implement parallelism for database and non-database functions in a computer program without the need of hard-coding all the parallelism support in the computer program itself. A database table is defined with instructions the user wants to execute in parallel. A user-defined function is then defined that executes the instructions in the table. A database operation is then defined for the table that invokes the user-defined function. When the database operation is executed, the database manager provides parallelism by executing multiple tasks in parallel in the user-defined function. The built-in parallelism in many modem database managers thus may be used to enable parallelism in a computer program by using user-defined functions in a manner not previously thought of before.

9 Claims, 6 Drawing Sheets

```
CREATE TABLE Application_X_Status(
    Step_Id      INTEGER NOT NULL CHECK(Step_Id BETWEEN 1 AND 5)
    Step_Status  INTEGER NOT NULL DEFAULT 0 CHECK(Step_Status IN (0,1))
    Step_Processing_Info    VARCHAR(32000))
```

FIG. 8

```
INSERT INTO Application_X_Status VALUES(1,0,'information necessary to execute step 1')
INSERT INTO Application_X_Status VALUES(2,0,'information necessary to execute step 2')
INSERT INTO Application_X_Status VALUES(2,0,'information necessary to execute step 3')
INSERT INTO Application_X_Status VALUES(2,0,'information necessary to execute step 4')
                                    ⋮
INSERT INTO Application_X_Status VALUES(5,0,'information necessary to execute step N')
```

FIG. 9

```
CREATE FUNCTION Application_X (
        Step_Id                  INTEGER,            1010
        Step_Processing_Info     VARCHAR(3200),      1012
        User_Invoking_Application_X   VARCHAR(128))  1014
RETURNS INTEGER         1020
LANGUAGE C              1030
NOT DETERMINISTIC       1040
MODIFIES SQL DATA       1050
CALLED ON NULL INPUT    1060
EXTERNAL NAME 'SCHEMA/PROGRAMX(ENTRY)'   1070
```

FIG. 10

```
CREATE FUNCTION Application_X (
        Step_Id                  INTEGER,           1010
        Step_Processing_Info     VARCHAR(3200),     1012
        User_Invoking_Application_X  VARCHAR(128))  1014
RETURNS INTEGER        1020
LANGUAGE C             1030
NOT DETERMINISTIC      1040
MODIFIES SQL DATA      1050
CALLED ON NULL INPUT   1060
EXTERNAL NAME 'SCHEMA/PROGRAMX(ENTRY)'   1070
PARAMETER STYLE DB2SQL  1110
NOT FENCED             1120
ALLOW PARALLEL         1130
SCRATCHPAD 1000        1140
FINAL CALL             1150
```

FIG. 11

```
SELECT      Application_X(Step_Id,Step_Processing_Info,'MJA')
FROM        Application_X_Status
WHERE       Step_Status = 0
ORDER BY    Step_Id
```

FIG. 12

```
UPDATE   Application_X_Status
SET      Step_Status = 1
WHERE    Step_Status = 0 AND
         Application_X(Step_Id,Step_Processing_Info,'MJA') = 0
```

FIG. 13

```
SELECT   (SUM(Step_Status)/COUNT(*)) * 100 AS Percent
FROM     Application_X_Status
```

FIG. 14

APPARATUS AND METHOD FOR ENABLING PARALLEL PROCESSING OF A COMPUTER PROGRAM USING EXISTING DATABASE PARALLELISM

BACKGROUND OF THE INVENTION

1. Technical Field

This invention generally relates to data processing, and more specifically relates to parallel processing in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Many modern computer systems are multi-threaded, which means that multiple threads of control (or tasks) may execute simultaneously. When a computer program needs to execute tasks in parallel, the code to handle the parallelism in the computer program is typically hard-coded within the computer program itself. Note that the term "computer program" is broadly defined herein to include any computer software, including applications, utilities, operating system code, etc. The execution of tasks in parallel requires the computer program itself to be specifically designed and written to utilize multiple threads. Because the interfaces to utilize threads and processes are not identical across all operating systems, a hard-coded computer program that includes parallelism is not easily portable to other operating systems.

The computer program that is written to use multiple threads must also implement several other complex aspects related to parallelism, such as: 1) a method to limit or modify the amount of parallelism; 2) a method to easily measure overall progress; 3) a mechanism to allow or disallow cancel of the request at reasonable boundaries such that the cancel does not leave the state of the data used by the computer program in an unpredictable state; and 4) a mechanism to define whether each portion of the computer program in a thread is safe or must be fenced from other parts of the computer program running in parallel. These complexities make the implementation of parallel processing in computer programs very time-consuming and expensive to define, write, test, and especially debug.

Referring to FIG. 2, a prior art method 200 for executing tasks in parallel starts by defining multiple threads or jobs (step 210). Once multiple threads or jobs are defined, the support for parallel processing is hard-coded into the computer program (step 220), as described in detail in the preceding paragraph. Hard-coding parallelism into computer programs is time-consuming and does not port well to other platforms. Without a way to easily enable parallelism in a computer program, the computer industry will continue to suffer from inefficient ways of performing parallel processing in computer programs.

DISCLOSURE OF INVENTION

An apparatus and method enable parallelism in a computer program using parallelism that is built-in to many modern database products. User-defined functions may be executed in parallel by these database products. User-defined functions are typically used in the art to define database operations directly on customer data. However, the parallelism provided by a database manager in executing user-defined functions also provides an easy way to implement parallelism for any arbitrary database or non-database functions in a computer program without the need of hard-coding all the parallelism support in the computer program itself. A new database table is defined that contains instructions for performing the various steps of the function (X) one wants to parallelize. Each row of the table contains the instructions for performing one or more of the steps of the function (X), the type of the step or instruction, and an indication of whether the instructions contained in that row are complete or not. A user-defined function is then defined that executes the instructions in the rows of the new table. A database operation (for example, an UPDATE or SELECT statement) is then defined that executes the new user-defined function on the rows of the new table. When the database operation is executed, the database manager provides parallelism by executing the new user-defined function on the rows of the new table in parallel. Since the instructions are contained in the rows, the function (X) is essentially executed in parallel. The built-in parallelism in many modern database products thus may be used to enable parallelism in a computer program by using user-defined functions in a manner not previously thought of before.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 8 shows pseudo-code for creating a sample table in accordance with the preferred embodiments;

FIG. 9 shows pseudo-code for inserting instructions into the table created in FIG. 8;

FIG. 10 shows pseudo-code for a first user-defined function that operates on the instructions stored it the database table created in FIG. 8;

FIG. 11 shows pseudo-code for a second user-defined function with DB2 extensions which operates on the instructions stored in the database table created in FIG. 8;

FIG. 12 shows pseudo-code for a first database query that may be used to execute the user-defined function;

FIG. 13 shows pseudo-code for a second database query that may be used to execute the user-defined function; and FIG. 14 shows pseudo-code for computing a percentage completion for a user-defined function.

BEST MODE FOR CARRYING OUT THE INVENTION

The preferred embodiments provide parallelism in a computer program by using parallelism that is built-in a database product in a new and unique way. Parallelism in a database product is provided to allow parallel database operations to be performed on customer data. However, the preferred embodiments recognize that a user-defined function may be defined that benefits from the parallelism provided by the database for user-defined functions, which may perform database and non-database functions. The parallelism in the database is therefore being used in a new way to simply enable parallel processing in any computer program using existing parallelism built into the database.

Figure 1:
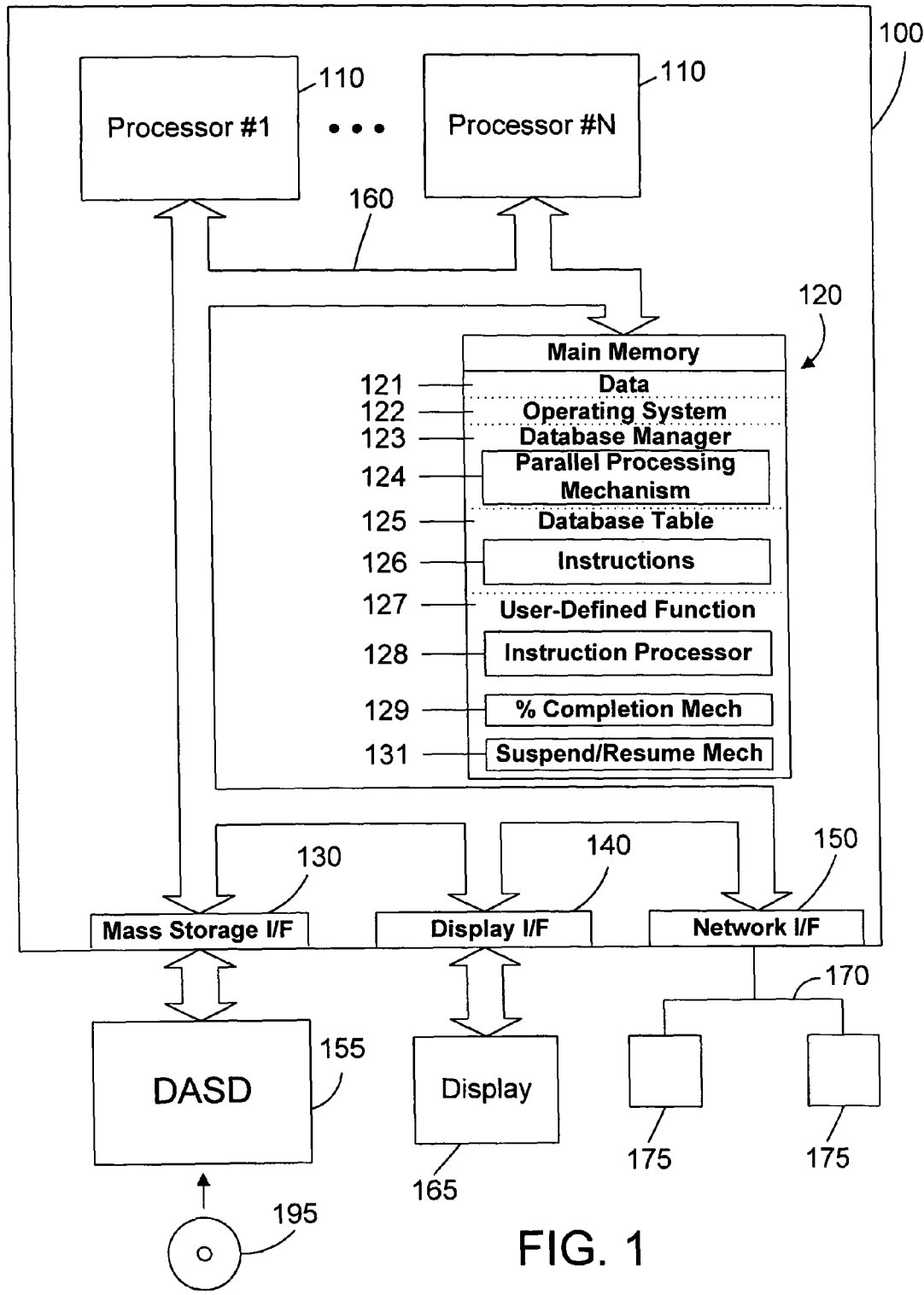
FIG. 1 is a block diagram of a computer apparatus in accordance with the preferred embodiments.
Figure 2:
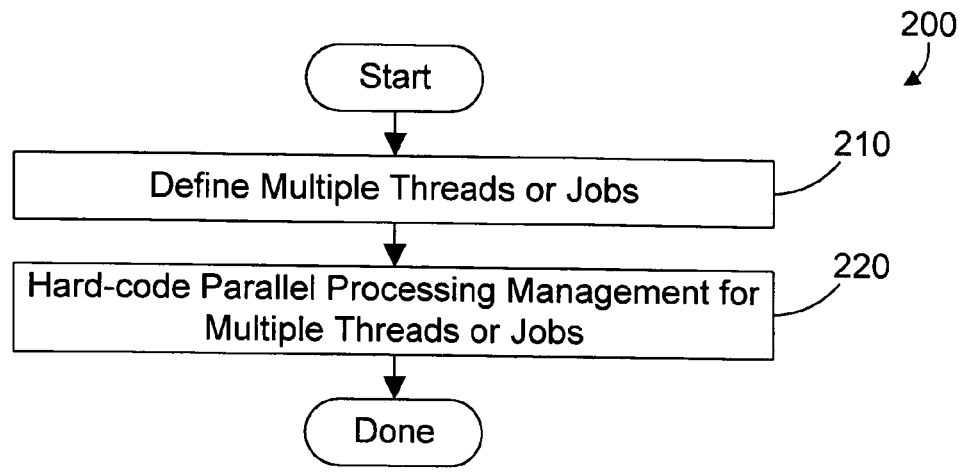
FIG. 2 is a flow diagram of a prior art method for providing parallelism in a computer program.

Referring to FIG. 1, a computer system 100 is an enhanced IBM eServer iSeries computer system, and represents one suitable type of computer system in accordance with the preferred embodiments. Those skilled in the art will appreciate that the mechanisms and apparatus of the present invention apply equally to any computer system. As shown in FIG. 1, computer system 100 comprises one or more processors 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195.

Main memory 120 contains data 121, an operating system 122, a database manager 123, a database table 125, and a user-defined function 127. Data 121 is any data that may be read or written by any processor 110 or any other device that may access the main memory 120. Operating system 122 is a multitasking operating system, such as OS/400, AIX, or Linux; however, those skilled in the art will appreciate that the spirit and scope of the present invention is not limited to any one operating system. Any suitable operating system may be used. Operating system 122 is a sophisticated program that contains low-level code to manage the resources of computer system 100. Some of these resources are processor 110, main memory 120, mass storage interface 130, display interface 140, network interface 150, and system bus 160.

Database manager 123 provides an interface for creating the database table 125 and for defining a user-defined function 127. The database manager 123 includes a parallel processing mechanism 124 that allows processing user-defined functions (such as 127) in parallel. The database manager 123 and parallel processing mechanism 124 are preferably provided by a commercial database product that is installed on computer system 100, as is known in the art.

Database table 125 is defined to include a plurality of user-defined instructions, referred to herein as instruction 126. These instructions 126 are read and executed by the user-defined function 127. In the preferred embodiments, the user-defined function 127 may be used to perform both database and non-database functions.

The user-defined function 127 includes an instruction processor 128 that processes the instructions 126 in the database table 125. The combination of the instructions 126 in the database table 125 and the instruction processor 128 in the user-defined function 127 thus provide a very powerful and flexible way to define user-defined functions, even those that are not database operations. The user-defined function 127 may be divided up into suitable steps represented by the instructions 126. These steps are preferably defined so that all the instructions in the row are atomic and upon completion of the instructions and indication that the instructions are complete is updated. This provides a mechanism that allows the function to be suspended and resumed easily. The suspend mechanism is implemented simply through the cancel support provided by the database manager. Since an indication is updated in each row as it is processed, the function can be restarted simply by executing the same database operation that was used to initially start the function as long as that operation is defined to only process rows that have not yet been processed. The user-defined function 127 also includes a percent completion mechanism 129 that can easily display the percent completion for the user-defined function 127 by dividing the number of instructions 126 that have been processed by the total number of instructions 126 in table 125.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database manager 123, database table 125, and user-defined function 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the operating system 122.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 3:
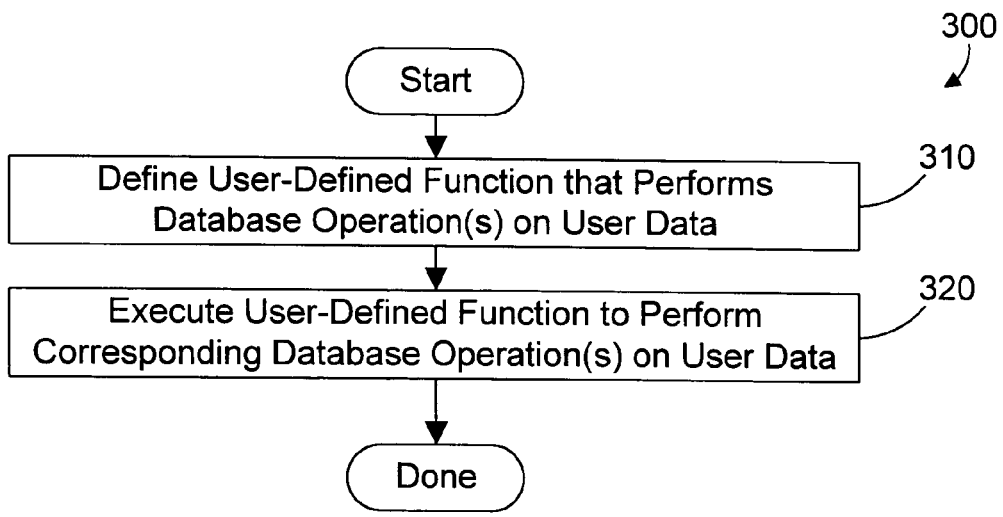
FIG. 3 is a flow diagram of a prior art method for using user-defined functions to perform database operations.

User-defined functions have been used in the past to perform database operations on customer data in parallel. For example, referring to FIG. 3, in prior art method 300, a user-defined function that performs one or more database operations on user data is defined (step 310). The user-defined function is then executed to perform the corresponding database operation(s) on user data (step 320). For example, a user-defined function could be defined that performs complex calculations on customer sales data and returns the resulting values. This type of parallelism is built-in to may known database products, including DB2 and Oracle. The preferred embodiments benefit from the parallelism built-in to these database products, but do so in a unique way that allows for defining both database and non-database operations in a user-defined function. As a result, parallelism may be achieved in a computer program by using the parallelism provided by a database product even though the operations being performed in parallel may not be database operations and do not directly operate on user data in the database.

Many modern computer programs are not enabled to run in parallel because the cost of doing so is so high. The preferred embodiments use a combination of features to achieve parallelism in a computer program using parallelism built-in to a database product. The first feature is a database product that allows defining user-defined functions that may be performed in parallel. The second feature is a table that includes rows that contain instructions. The third feature is a user-defined function that runs the instructions in the database table. The fourth feature is a database operation that accesses the table and invokes the user-defined function. Using the combination of these features, parallelism may be easily built into any computer program by defining a table that includes instructions and by defining a user-defined function that executes the instructions in the table. When a query that accesses the table and that processes the user-defined function is performed, multiple instructions are executed in parallel by the database product, resulting in parallel operation from the built-in parallelism in the database product rather than having to hard-code parallelism into the computer program.

By taking advantage of parallelism already built-in to a database product, most of the specific design, code, test and debug related to parallel processing is eliminated because the database product itself provides the facilities to manage the complex aspect of parallelism mentioned above. This makes it far less expensive to implement parallel processing in computer programs since existing features are used to achieve parallelism.

Figure 4:
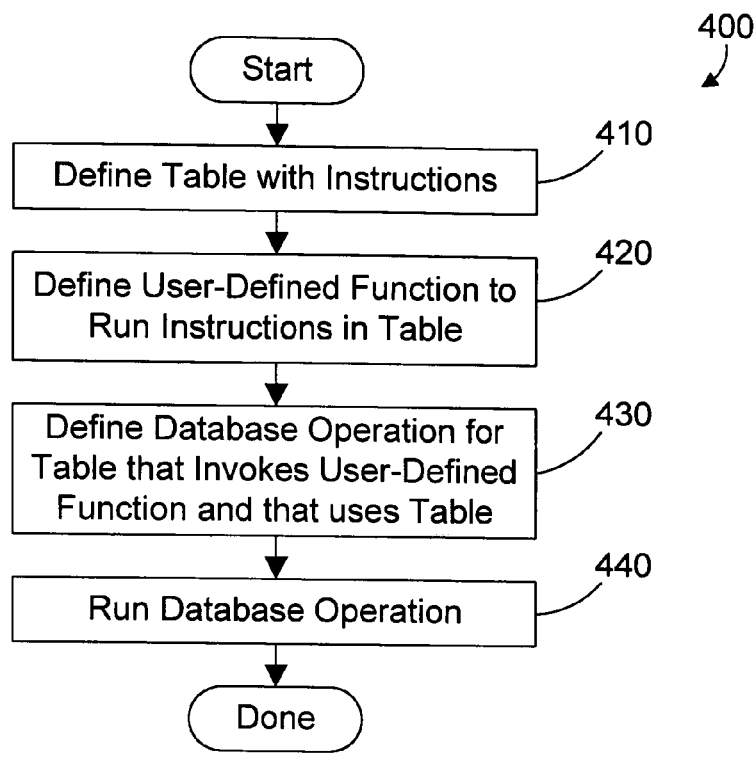
FIG. 4 is a flow diagram of a method for enabling parallelism in a computer program in accordance with the preferred embodiments.

Referring to FIG. 4, a method 400 for providing parallelism in a computer program in accordance with the preferred embodiments begins by defining a table with instructions (step 410). A user-defined function is then defined to run the instructions in the table (step 420). A database operation (such as a query) is then defined that invokes the user-defined function and that uses the table (step 430). The database operation is then executed (step 440). The execution of the database operation in step 440 is performed by the database manager, which generates multiple threads for the user-defined function, which can then execute the instructions in the table in parallel.

Figure 5:
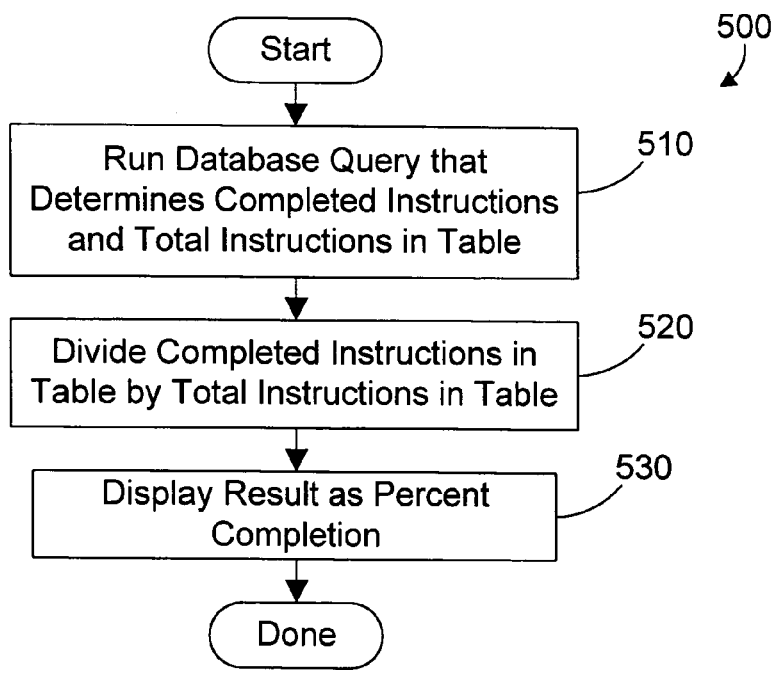
FIG. 5 is a flow diagram of a method for computing percent completion of a user-defined function.

One advantage of defining user-defined functions that process instructions in a table as shown in FIG. 4 is that the instructions provide natural boundaries that may be used in computing percent completion or that may be used to suspend and resume the user-defined function. As shown in FIG. 5, a method 500 can easily display percent completion of the user-defined function by running a query that determines the completed instructions in the table and that determines the total instructions in the table (step 510). The number of completed instructions is then divided by the total number of instructions in the table (step 520). The result of the computation is displayed as a percent completion (step 530). Note that method 500 is preferably performed by percent completion mechanism 129 in FIG. 1.

Figure 6:
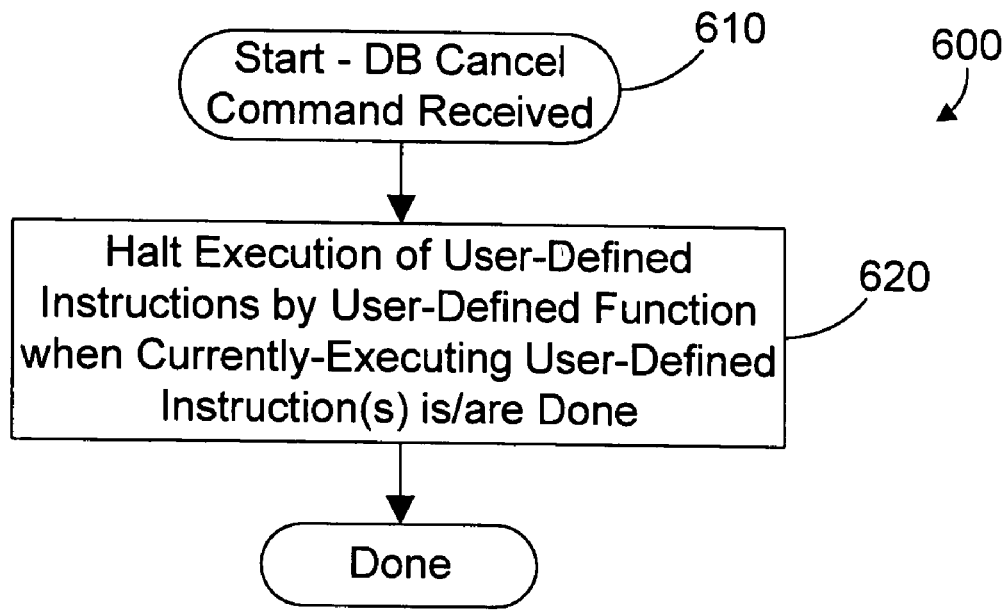
FIG. 6 is a flow diagram of a method for suspending execution of a user-defined function.
Figure 7:
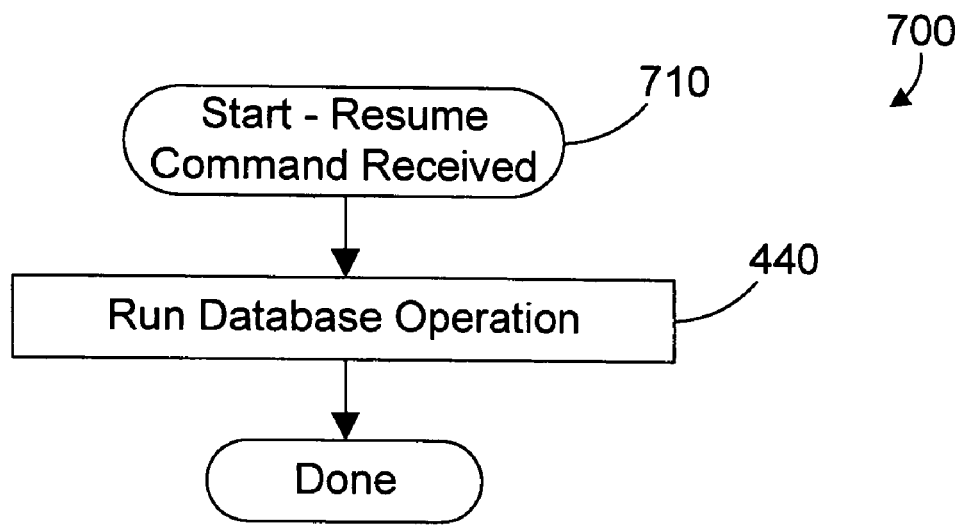
FIG. 7 is a flow diagram of a method for resuming execution of a user-defined function.

The natural boundaries of the instructions in the table also provide a way to suspend and resume execution of the user-defined function. Referring to FIG. 6, a method 600 for suspending execution of the function begins when a cancel command is received (step 610). Database products typically provide a general mechanism in the current art to cancel a database operation. In response, the execution of the database operation (and the instructions being executed by the user-defined function) is halted when the currently-executing instructions have completed (step 620). Since each row of the table contains an indication of whether the instructions in the row have completed, the execution of a suspended function may be resumed simply by executing the same database operation that was originally used, as shown in method 700 of FIG. 7. Method 700 resumes either when the original function is started again or when a resume command is received (step 710). When the database operation is executed (step 440), the execution of the instructions in the table by the user-defined function is then resumed at the next set of instructions (i.e. the first instruction that has not yet been executed). Note that methods 600 and 700 in FIGS. 6 and 7, respectively, are preferably performed by suspend/resume mechanism 131 in FIG. 1.

An example now follows to show how parallelism may be built into a computer program using built-in parallelism in a database product. The first step as shown in FIG. 410 of FIG. 4 is to define a database table that includes instructions. Each instruction in the table needs to include identification of the instruction and information to tell the instruction how to process that instruction. It might also include a status column that indicates whether the instruction has been executed by the user-defined function or not. The table may be created as a temporary table if the computer program is not interruptible and restartable. If a requirement of the computer program is to allow it to be suspended and resumed, the table will be created as a permanent table.

Referring to FIG. 8, a table Application_X_Status is defined to have three columns, Step_Id, Step_Status and Step_Processing_Info. The table definition in FIG. 8 satisfies step 410 in FIG. 4. The Step_Id field contains an identifier that identifies the "type" of instruction for that row of the table. The Step_Status field contains a zero if the instruction has not been processed by the user-defined function, and contains a one if the instruction has been processed by the user-defined function. The Step_Processing_Info contains whatever information is needed by the user-defined function to execute the instruction in that row. Note that the CHECK constraints are not necessary, but provide a simple way of making sure the computer program does not insert instructions that contain invalid steps or status in the table.

Once the table is created, the instructions may be inserted into the table, as shown by the operations in FIG. 9. In this case, only a single step of type 1 is necessary followed by many steps of type 2 through 5. Once the instructions have been inserted into the table, they are ready for execution by a user-defined function.

The next step is to define a user-defined function that will process the instructions in the table. Such a function is shown in FIG. 10, and satisfies step 420 in FIG. 4. User-defined functions are typically used in the art to return specific values given specific arguments. The arguments are typically columns of existing tables in the database. For example, a user might write a user-defined function to convert amounts of money stored in US dollars in an existing database column to another currency. The preferred embodiments use user-defined functions in a completely different way. While the return value of this user-defined function can potentially be used to return some information about the processing of the individual instruction, the value returned by the user-defined function is more likely to be insignificant. The user-defined function is simply used as a way to get the database product to run the code in the user-defined function in parallel.

There are many types of user-defined functions that known database products support. While any can potentially be used, it is more likely that an external user-defined scalar function will be used. An external function means that the function is written in some external programming language (C, for example). A scalar function is used so that the values in each row of the table can be passed to the user-defined function. It should be noted that if a computer program is already written in an external language, it is possible that it can be modified to be an external scalar function. Thus, the preferred embodiments can be used to take a nonparallel computer program and convert it to parallel operation very inexpensively.

The user-defined function in FIG. 10 has the parameters of Step_Id at line 1010, Step_Processing_Info at line 1012, and User_Invoking_Application_X at line 1014. The User_Invoking_Application_X, Step_ID, and Step_Processing_Info are all passed to the user-defined function by the database manager. The user-defined function can be thought of as a black box. All it knows is that it is being passed a set of arguments telling it what to do. The Application_X function returns an integer as shown at line 1020. The definition of a scalar function is that it must return a result. This integer is likely insignificant, but it could be used to return some information about the processing of the instructions passed to it. The attributes of the user-defined function can vary widely. In this example, the user-defined function is written in C as shown in line 1030, is not deterministic (that is, the result of the function may not be the same given the same instructions) as shown in line 1040, modifies SQL data (that is, the instructions will make changes to data in the database) as shown in line 1050, is called on NULL input (that is, the user-defined function will be called even if the values in the row contain the null value) as shown at line 1060, and has an external name of SCHEMA/PROGRAMX(ENTRY) at line 1070, which is the name of the entry point in the C program that is created to process the instructions of the steps of the computer program. The user-defined function in FIG. 10 processes the instructions shown in FIG. 9 that reside in the table.

It should be noted that many existing database products have implemented extensions to the SQL standard that may be useful in writing the user-defined function. Using extensions to the standard, however, will reduce the portability between platforms. For example, the SQL statement in FIG. 11 creates the same user-defined function as shown in FIG. 10, but it uses five additional clauses that are DB2 extensions to the standard at lines 1110, 1120, 1130, 1140 and 1150. PARAMETER STYLE DB2SQL at line 1110 indicates that this is a DB2 extension to the standard. NOT FENCED at line 1120 indicates the function is safe from other concurrent threads running in parallel. ALLOW PARALLEL at line 1130 indicates the function can be invoked in parallel. SCRATCHPAD 1000 at line 1140 indicates the database manager will maintain a scratchpad of 1000 bytes where the user-defined function can store information that will be returned on each invocation of the function. FINAL CALL at line 1150 indicates the user-defined function will be given a final call so it can perform any cleanup that is necessary.

Now that the table and user-defined function are created, they can be put together by running a parallel database operation that uses both the table and the user-defined function. Note that if the steps of the computer program must be performed in a specific order, it may be necessary to specify an ORDER BY clause to guarantee that order. For example, the SQL SELECT statement shown in FIG. 12 may be used to run the user-defined function against each instruction stored in the table. In this particular example, three parameters are passed when the Application_X function is invoked, namely: Step_Id at line 1010, Step_Processing_Info at line 1012, and User Invoking Application at line 1014. The Step_Id and Step Processing_Info are retrieved from the instructions in the table, while the parameter MJA is passed in to signify initials of a user. The user-defined function could then perform some suitable function relating to the user, such as security checking or logging.

Note that only the rows that have not already been processed are selected. Thus, the same database query that is used to initially start the function may also be used to restart the operation after it has been interrupted. Note that since this query is a SELECT statement, the user-defined function would contain the code to update the row to indicate that the instructions in the row have been complete.

If results are not desired or necessary, the UPDATE or DELETE statement can be used. For example, the SQL UPDATE statement in FIG. 13 is an alternative database operation that processes the instructions in the table in parallel by the user-defined function. For the UPDATE statement in FIG. 13, as each row of the table is processed, the Step Status is updated to indicate the instruction in the row has been processed. Note that some database products do not allow updating the Step_Status. If this is the case, the Step_Status will have to be updated in the user-defined function itself. The updating of Step_Status provides a built-in mechanism for measuring progress. For example, the SQL SELECT statement in FIG. 14 may be run to return the percent complete of the computer program at any time while it is running. The SELECT statement of FIG. 14 thus represents one specific implementation of the percent completion mechanism 129 in FIG. 1.

If other database operations are performed in the external C program that defines the user-defined function, it may be useful to perform those operations under the same transaction as the UPDATE or DELETE operation. This guarantees that the update to a row of the database and the database operations performed in the instruction represented by that row of the table are guaranteed to be complete or to be rolled back. Some database products even allow COMMIT to be performed from within a user-defined function, which allows an interrupted computer program to be restartable since the table accurately represents the progress the computer program has made. In this case, the suspend/resume mechanism 131 in FIG. 1 can perform suspending and resuming of the user-defined function.

The preferred embodiments use the parallel processing of user-defined functions in a database in an unconventional way to achieve parallel processing of both database and non-database operations in a computer program. Because the database provides the required parallelism, there is no need to hard-code support for parallel processing in the computer program itself. The result is enabling of parallel processing in a computer program in a way that is very reliable and inexpensive.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a database residing in the memory, the database including a database manager that provides parallel execution of user-defined functions;
   a table residing in the memory that includes a plurality of instructions;
   a user-defined function that executes the plurality of instructions in the table; and
   a database operation residing in the memory that references the table and the user-defined function to provide parallel execution of the plurality of instructions in the table using the parallel execution of user-defined functions provided by the database manager;
   a percent completion mechanism residing in the memory that computes percent completion of the user-defined function by dividing a number of completed rows in the table by a number of total rows in the table; and
   a suspend/resume mechanism residing in the memory that suspends the execution of the user-defined function when a currently-executing instruction is completed.

2. The apparatus of claim 1 wherein the user-defined function comprises a scalar function.

3. An apparatus comprising:
   at least one processor;
   a memory coupled to the at least one processor;
   a database residing in the memory, the database including a database manager that provides parallel execution of user-defined functions;
   a table residing in the memory that includes a plurality of instructions;
   a user-defined scalar function that executes the plurality of instructions in the table;
   a database operation residing in the memory that references the table and the user-defined function to provide parallel execution of the plurality of instructions in the table using the parallel execution of user-defined functions provided by the database manager, wherein the database manager computes percent completion of the user-defined function by dividing a number of completed rows in the table by a number of total rows in the table; and
   a suspend/resume mechanism residing in the memory that suspends the execution of the user-defined function when a currently-executing instruction is completed,
   and that resumes the execution of the user-defined function by commencing execution of a next instruction in the table.

4. A computer-implemented method for providing parallel execution in a computer program, the method comprising the steps of:
   using a database manager that provides parallel execution of user-defined functions to create a table that includes a plurality of instructions;
   defining a user-defined function that executes the plurality of instructions in the table;
   defining a database operation that references the table and the user-defined function to provide parallel execution of the plurality of instructions in the table using the parallel execution of user-defined functions provided by the database manager;
   executing the database operation;
   computing percent completion of the user-defined function by dividing a number of completed rows in the table by a number of total rows in the table; and
   suspending the execution of the user-defined function when a currently-executing instruction is completed.

5. The method of claim 4 wherein the user-defined function comprises a scalar function.

6. A computer-implemented method for providing parallel execution in a computer program, the method comprising the steps of:
   using a database manager that provides parallel execution of user-defined functions to create a table that includes a plurality of instructions;
   defining a user-defined scalar function that executes the plurality of instructions in the table;
   defining a database operation that references the table and the user-defined function to provide parallel execution of the plurality of instructions in the table using the parallel execution of user-defined functions provided by the database manager;
   executing the database operation;
   computing percent completion of the user-defined function by dividing a number of completed rows in the table by a number of total rows in the table;
   suspending the execution of the user-defined function when a currently-executing instruction is completed; and
   resuming the execution of the user-defined function by commencing execution of a next instruction in the table.

7. A program product comprising:
   a table that includes a plurality of instructions, the table being defined using a database manager that provides parallel execution of user-defined functions;
   a user-defined function that executes the plurality of instructions in the table; a database operation that references the table and the user-defined function to provide parallel execution of the plurality of instructions in the table using the parallel execution of user-defined functions provided by the database manager;
   a percent completion mechanism that computes percent completion of the user-defined function by dividing a number of completed rows in the table by a number of total rows in the table;
   a suspend/resume mechanism that suspends the execution of the user-defined function when a currently-executing instruction is completed; and
   recordable media bearing the table, the user-defined function, and the database operation, the percent completion mechanism, and the suspend/resume mechanism.

8. The program product of claim 7 wherein the user-defined function comprises a scalar function.

9. A program product comprising:
- a table that includes a plurality of instructions, the table being defined using a database manager that provides parallel execution of user-defined functions;
- a user-defined function that executes the plurality of instructions in the table;
- a database operation that references the table and the user-defined function to provide parallel execution of the plurality of instructions in the table using the parallel execution of user-defined functions provided by the database manager;
- a percent completion mechanism that computes percent completion of the user-defined function by dividing a number of completed rows in the table by a number of total rows in the table;
- a suspend/resume mechanism that suspends the execution of the user-defined function when a currently-executing instruction is completed, and that resumes the execution of the user-defined function by commencing execution of a next instruction in the table; and
- recordable media bearing the table, the user-defined function, the database operation, the percent completion mechanism, and the suspend/resume mechanism.

* * * * *